United States Patent [19]

Pirovano

[11] Patent Number: 4,567,980
[45] Date of Patent: Feb. 4, 1986

[54] DRIVE UNIT FOR A CONVEYOR OF THE TUBE-ENCASED CABLE TYPE WITH SPACED-APART CONVEYING ELEMENTS, FOR MATERIALS OF FLUID BEHAVIOR

[75] Inventor: Camillo Pirovano, Cernusco Lombardone, Italy

[73] Assignee: AZA International s.r.l., Monza, Italy

[21] Appl. No.: 559,172

[22] Filed: Dec. 7, 1983

[30] Foreign Application Priority Data

Sep. 6, 1983 [IT] Italy ............................... 22836/83[U]

[51] Int. Cl.⁴ ....................... B65G 23/44; B65G 23/08
[52] U.S. Cl. ................................... 198/814; 198/815; 198/834
[58] Field of Search ............... 198/716, 813, 834, 814, 198/729, 733, 815, 816; 474/114, 115

[56] References Cited

U.S. PATENT DOCUMENTS

| | | | |
|---|---|---|---|
| 2,130,433 | 9/1938 | Webb | 198/684 |
| 2,130,492 | 9/1938 | Hapman | 198/716 |
| 2,202,882 | 6/1940 | Wylie | 198/815 |
| 2,515,988 | 7/1950 | Conrad | 198/815 |
| 2,643,760 | 6/1953 | Bortner | 198/716 |
| 2,791,126 | 5/1957 | Christopher | 474/114 |
| 2,940,424 | 6/1960 | Rose et al. | 198/716 |
| 3,993,184 | 11/1976 | Campbell | 198/716 |
| 4,175,657 | 11/1979 | Dehne et al. | 198/833 |
| 4,197,938 | 4/1980 | Klinkenberg | 198/716 |
| 4,372,440 | 2/1983 | Ringis | 198/813 |
| 4,396,112 | 8/1983 | von Wretersheim et al. | 198/814 |
| 4,502,827 | 3/1985 | Shows | 198/716 |

FOREIGN PATENT DOCUMENTS

| | | | |
|---|---|---|---|
| 78217 | 11/1949 | Czechoslovakia | 198/813 |
| 2634582 | 2/1978 | Fed. Rep. of Germany | 198/813 |
| 809434 | 3/1937 | France | 474/115 |
| 350076 | 6/1931 | United Kingdom | 198/813 |
| 526561 | 9/1976 | U.S.S.R. | 198/813 |

Primary Examiner—Joseph E. Valenza
Assistant Examiner—Daniel R. Alexander
Attorney, Agent, or Firm—Stevens, Davis, Miller & Mosher

[57] ABSTRACT

A drive unit for distribution systems for materials of fluid behavior, such as livestock feed materials, in which a cable provided with spaced-apart conveying elements is caused to slide inside a tube, said drive unit being of the type comprising a geared motor, on the output shaft of which there is fixed a toothed wheel about which the cable winds. The geared motor is mounted on a supporting structure in a freely oscillating manner such that as the tension in the slack branch of the cable varies, the position of the axis of the toothed wheel varies by virtue of its rotation about an axis passing essentially through the point of tangency between the toothed wheel and the taut branch of the cable.

4 Claims, 5 Drawing Figures

1

DRIVE UNIT FOR A CONVEYOR OF THE TUBE-ENCASED CABLE TYPE WITH SPACED-APART CONVEYING ELEMENTS, FOR MATERIALS OF FLUID BEHAVIOR

BACKGROUND OF THE INVENTION

This invention relates to an improved drive unit for conveyors for materials of fluid behaviour, such as feed metarials in livestock rearing stations, where the conveyor is of the type comprising a cable on which there are fitted spaced-apart conveying elements in the form of discs or fins, the cable being made to slide endlessly inside a tube so as to discharge the feed material into feeding troughs from which the animals eat.

As is well known to experts in this particular art, one of the problems to be solved in designing systems of this kind is the problem of tension variations in the cable. The degree of cable tension is subject to variation both during the operation of the system due to variations in the load applied to it, and by virtue of the elongation which occurs with time, and which is particularly felt in systems of a certain length.

In seeking to automatically take-up these cable tension variations, the main approach has been to provide deviation pulleys mounted in a floating manner and subjected to the action of return springs or counterweights.

However, such arrangements have not given completely satisfactory results, in particular because they make the system drive unit rather bulky and more costly.

SUMMARY OF THE INVENTION

The object of the present invention is therefore to obviate the aforesaid technical problem by providing a drive unit which itself incorporates a system able to automatically and adequately take-up tension variations in the conveyor cable, without requiring the use of bulky and costly auxiliary members additional to those which form the structure of the unit itself.

This object is attained according to the present invention by a drive unit for distribution systems for materials of fluid behaviour, such as livestock feed materials, in which a cable provided with spaced-apart conveying elements is caused to slide inside a tube, said drive unit being of the type comprising a geared motor, on the output shaft of which there is fixed a toothed wheel about which said cable winds, and being characterised in that the geared motor is mounted on a supporting structure in a freely oscillating manner such that as the tension in the black branch of the cable varies, the position of the axis of said toothed wheel varies by virtue of its rotation about an axis which passes essentially through the point of tangency between the toothed wheel and the taut branch of the cable.

BRIEF DESCRIPTION OF THE DRAWING

The structural and operational characteristics of the present invention and its advantages over the known art will be more apparent from the description given hereinafter of one embodiment thereof with reference to the accompanying drawings, in which.

DESCRIPTION OF THE PREFERRED EMBODIMENTS

Figure 1:
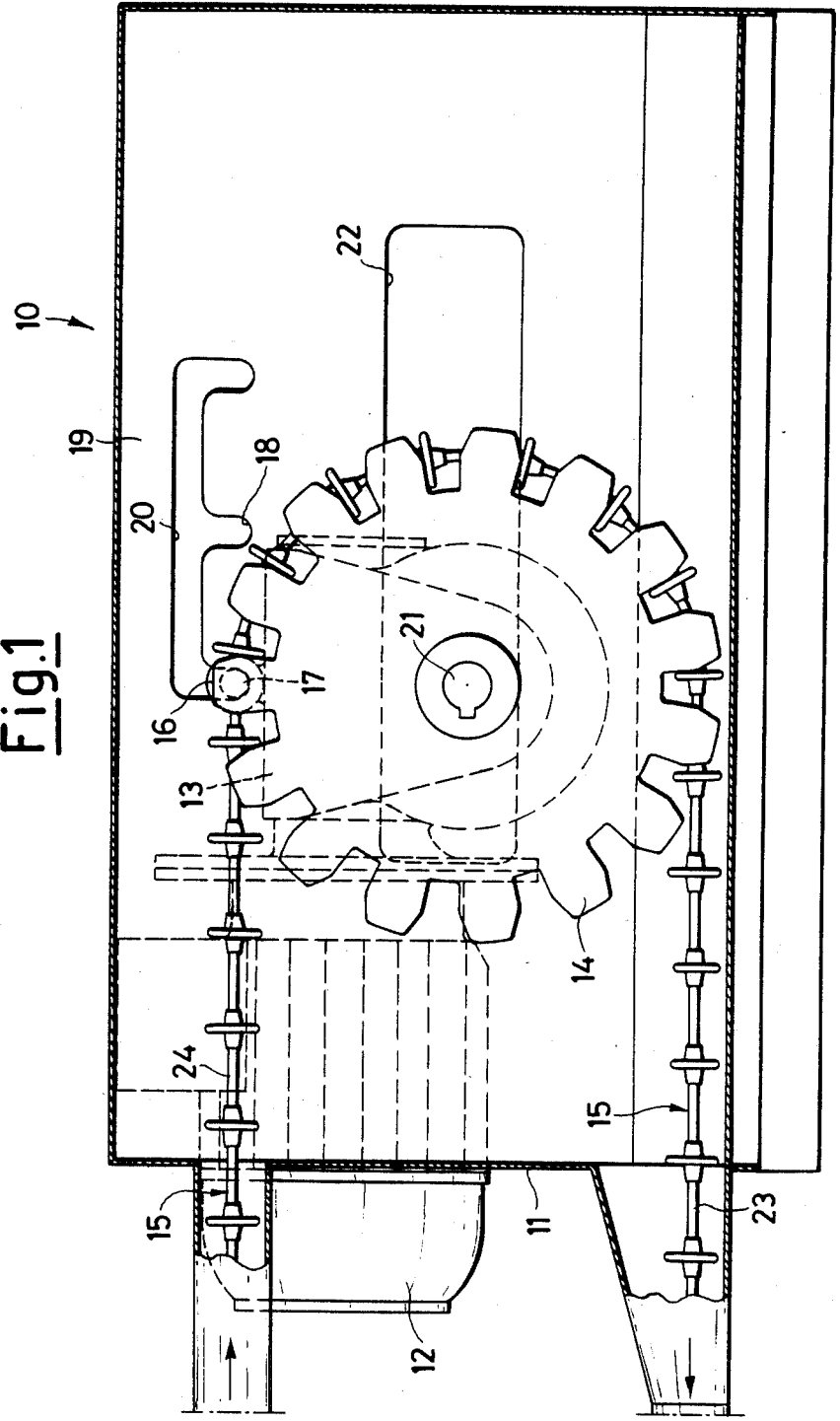
FIG. 1 is a partly broken sectional elevation on the line I—I of FIG. 2 showing a drive unit incorporating the principles of the invention.
Figure 2:
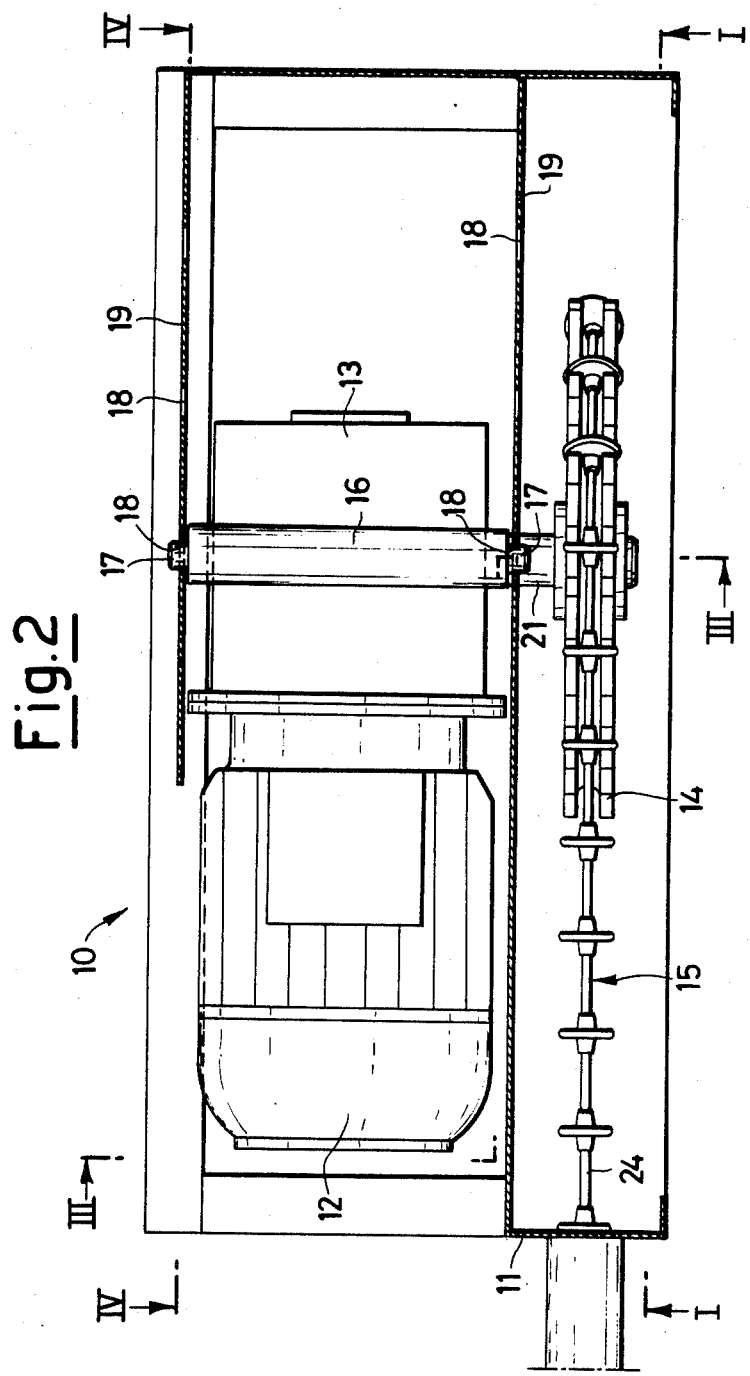
FIG. 2 is a plan view.
Figure 3:
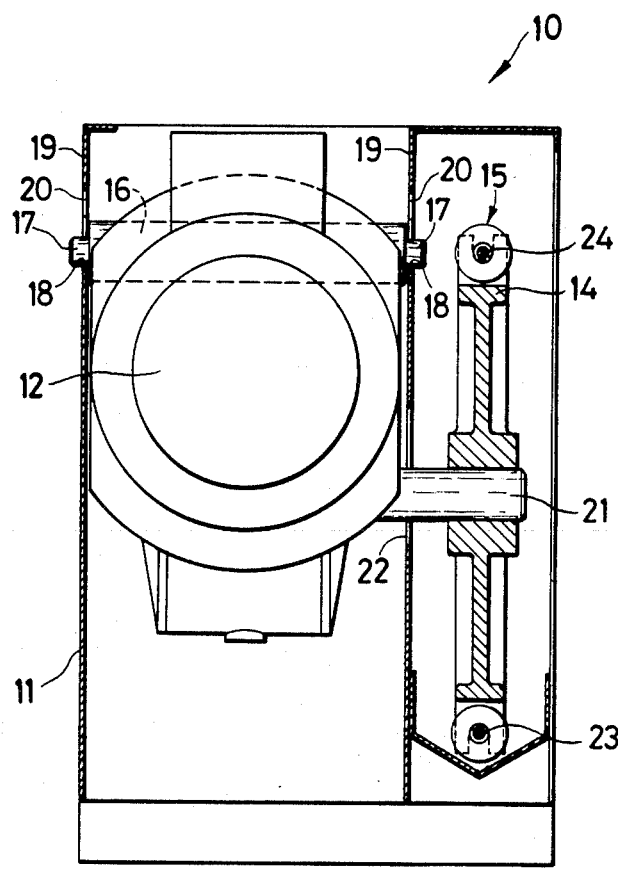
FIG. 3 is a section on the line III—III of FIG. 2.

With reference to the drawings, a drive unit constructed in accordance with the principles of the invention is indicated overall by 10, and comprises an essentially box-like casing 11 for supporting and containing an assembly consisting of a motor 12 and reduction gear 13 which, by way of a toothed wheel 14, drives a tube-encased disc-type conveyor cable 15, of the kind well known in the livestock field.

According to the present invention, the assembly comprising the motor 12 and reduction gear 13 is mounted to freely oscillate about a shaft 16 which rotates on end journals 17 housed in respective cradles 18 provided in opposing walls 19 of the box casing 10. Preferably there is provided a plurality of pairs of cradles 18 formed along slots 20, so as to be able to mount the geared motor assembly inside the casing 10 in the most suitable position according to the tension in the cable 15.

As can be clearly seen from the drawings, the shaft 16 is fixed to the top of the reduction gear 13 in a position radial to the toothed wheel 14.

The drive shaft 21 projects through a wide slot 22 from the geared motor containing chamber defined by the opposing walls 19. In this manner, the drive shaft 21 is free to move along the slot 22 in a curved line trajectory when the shaft 16 rotates either clockwise or anticlockwise.

In this manner it is apparent that any tension variation in the cable 15 is taken-up by oscillation of the drive shaft 21, and thus by a movement of the toothed wheel 14, determined by the counterweight due to the motor 12. In this respect, it should be noted that the fact that the shaft 16 passes through the point of tangency of the taut upper branch 24 of the cable 15 means that the action of this branch has practically no influence on the system equilibrium.

Figure 5:
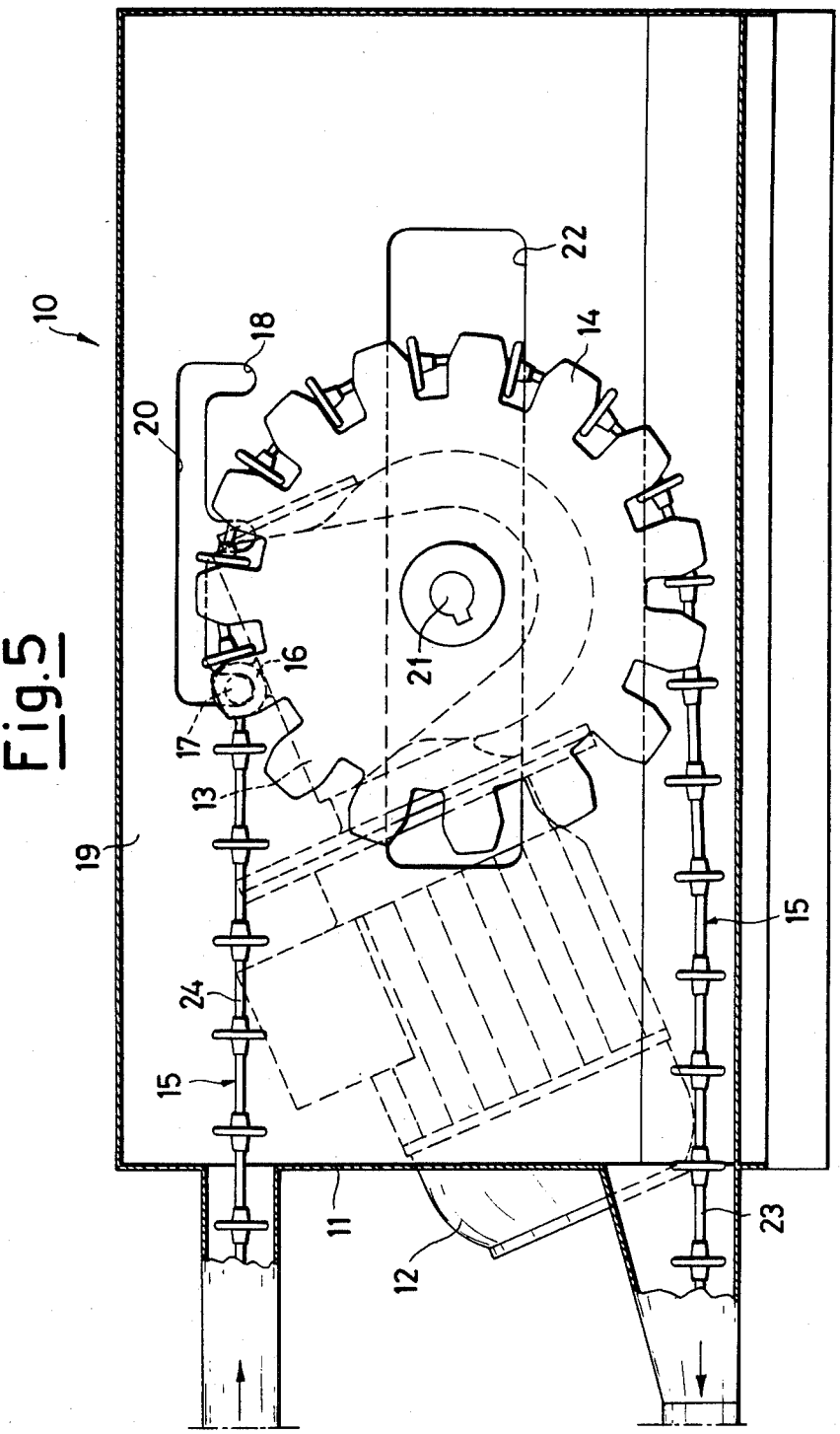
FIG. 5 is a view such as that of FIG. 1, but showing the toothed drive wheel for the conveyor cable in a different operating position.

It is also apparent that the shaft 21 will move towards the right along the slot 22 (for example from the position of FIG. 1 to the position of FIG. 5) if the slack in the lower branch 23 increases, due for example to an overload, for example on starting the system, or to cable elongation induced by time fatigue.

In contrast, if the load on the slack branch 23 reduces, the drive shaft 21 and thus the wheel 14 will move towards the left. The invention therefore provides a drive unit for a tube-encased cable conveyor for materials of fluid behaviour, which advantageously incorporates a system for taking-up any cable tension variations, which uses no auxiliary means additional to the geared motor, its supporting structure and its container, but instead uses a particular and original mounting arrangement for said geared motor, which can oscillate relative to said casing.

Figure 4:
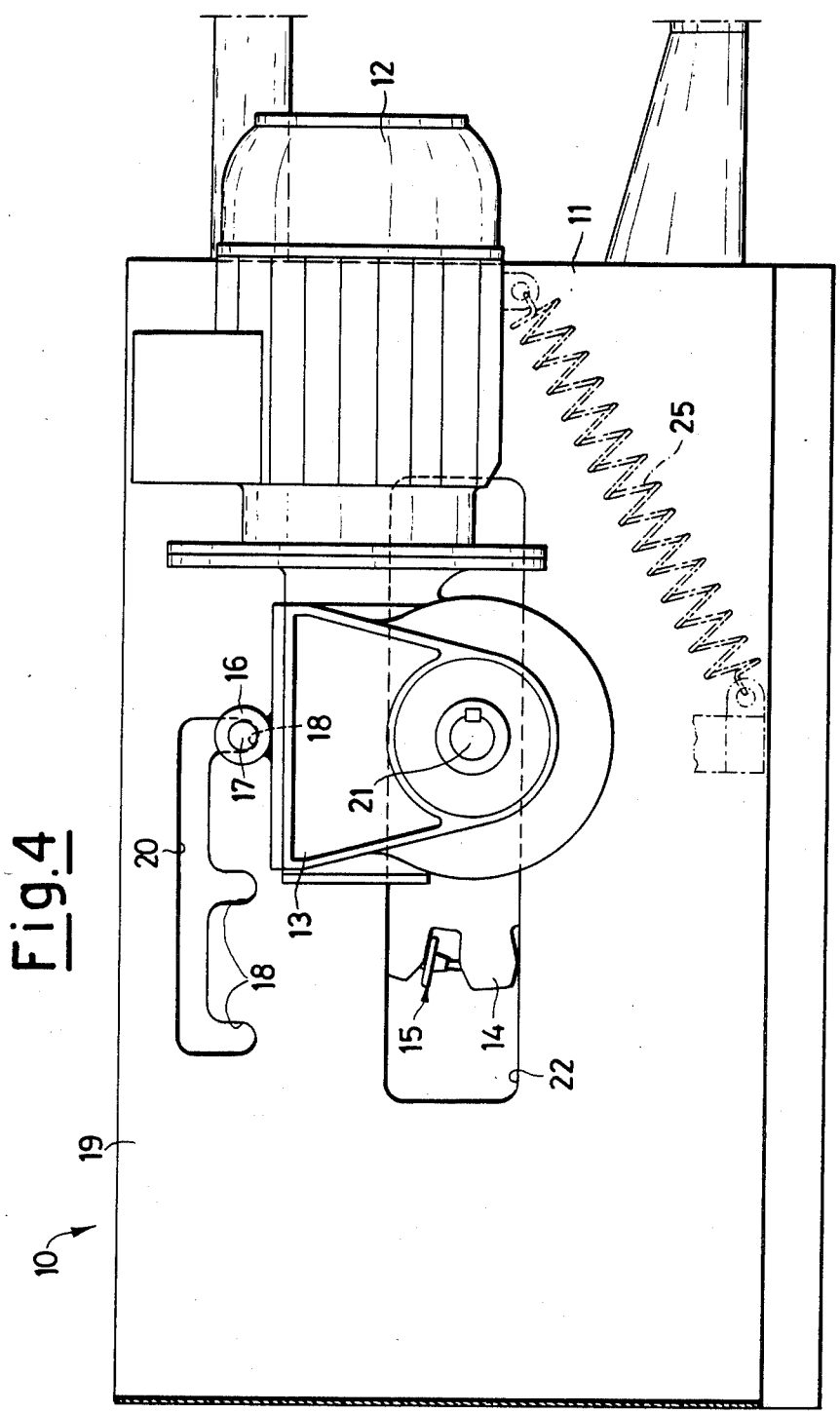
FIG. 4 is a partly broken sectional elevation on the line IV—IV of FIG. 2.

The drive unit according to the invention, which is described and illustrated herein by way of non-limiting example only, is of the type suitable for vertical positioning, i.e. for systems in which the taut and slack branches of the conveying cable pass parallel to each other about the toothed drive wheel, which rotates about a horizontal axis, the pivoting axis of the geared motor also being horizontal. However, the principle of the invention is also applicable to drive units in which both the axis of rotation of the toothed drive wheel and the pivoting axis of the geared motor are vertical. In this case, a counteracting spring 25 indicated by dashed and dotted lines in FIG. 4 cooperates with the geared motor.

I claim:

1. A drive unit for distribution of materials of fluid behaviour, such as livestock feed materials, in which a cable provided with spaced-apart conveying elements is caused to slide inside a tube, comprising a geared motor, an output shaft for said motor a toothed wheel fixed to said shaft about which said cable winds, a supporting structure upon which said geared motor is mounted in a freely oscillating manner such that as the tension in the slack branch of the cable varies, the position of the axis of said toothed wheel varies by virtue of its rotation about an axis passing essentially through the point of tangency between the toothed wheel and the taut branch of the cable.

2. The unit as claimed in claim 1, wherein said support structure comprises two opposing walls of a box-like support and containing casing, one of said walls defining a slot through which passes said output shaft.

3. The unit as claimed in claim 1, wherein said geared motor has an axis of oscillation which is horizontal.

4. The unit as claimed in claim 1, wherein said geared motor has an axis of oscillation which is vertical, and including a return spring provided between the geared motor and the supporting structure.

* * * * *